3,794,710
GAS DESULFURIZATION
John J. Merrill, San Rafael, Calif., assignor to Chevron Research Company, San Francisco, Calif.
Filed Sept. 17, 1971, Ser. No. 181,395
Int. Cl. C01b 17/04, 17/16
U.S. Cl. 423—220      6 Claims

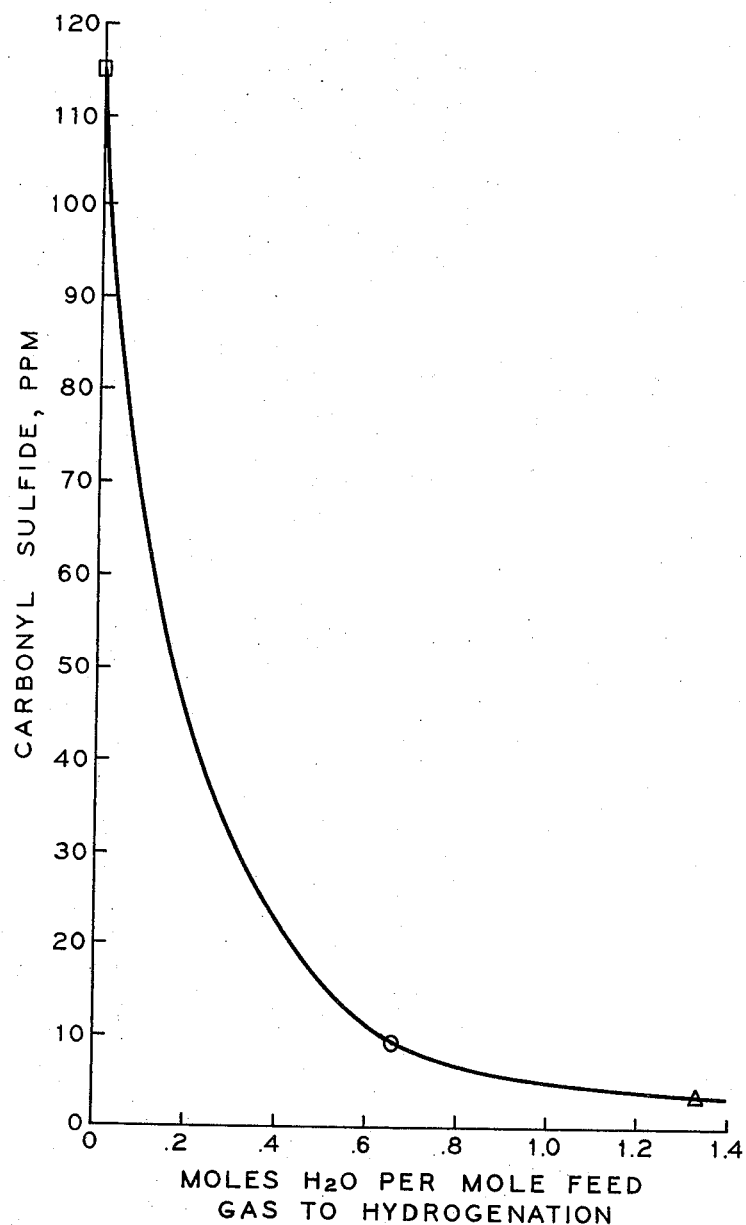

ABSTRACT OF THE DISCLOSURE

A process for removing sulfur compounds from sulfur plant tail gases comprising $SO_2$, COS, $CS_2$, entrained and vaporized S, and $H_2S$ which comprises:

(a) oxidizing the tail gas stream to convert COS, $CS_2$ and entrained and vaporized S to $SO_2$ and $CO_2$, and thereby obtain an oxidized gas stream comprising $SO_2$ and $CO_2$, (b) feeding the oxidized gas stream to a hydrogenating zone and therein hydrogenating the oxidized gas stream by a process which comprises contacting the oxidized gas stream with a hydrogenation catalyst at a temperature between 400° and 900° F., and in the presence of hydrogen gas to obtain a hydrogenated gas stream comprising $H_2S$ and $CO_2$, (c) scrubbing $H_2S$ from the hydrogenated gas stream to obtain a purified stream.

It is particularly preferred to maintain at least 0.4 mole $H_2O$ in the oxidized gas stream fed to the hydrogenation zone per mole of said oxidized gas stream in order to maintain the COS concentration in the effluent from the hydrogenation zone at a very low part per million level.

BACKGROUND OF THE INVENTION

The present invention relates to removal of sulfur compounds from sulfur plant tail gas streams.

Sulfur production plants are typically based on the reaction

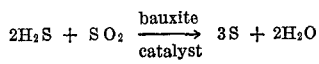

$$2H_2S + SO_2 \xrightarrow[\text{catalyst}]{\text{bauxite}} 3S + 2H_2O$$

To obtain the sulfur dioxide for the reaction with the hydrogen sulfide, typically a portion of a hydrogen sulfide stream is burned to form sulfur dioxide. After reaction of the $SO_2$ with the $H_2S$ in the sulfur plant reactors at elevated temperature, sulfur is separated from the reactor effluent by condensation of the elemental sulfur. The gases remaining after condensation are "tail gases."

What to do with the tail gas stream is a particularly important current problem in view of the strong desire to decrease release of sulfur contaminants to the atmosphere. As pointed out in "Hydrocarbon Processing," March 1964, p. 107, one solution is to use three stages of conversion, that is, three zones for reaction of $H_2S$ with $SO_2$ over the typical bauxite catalyst instead of using the more common two zones of conversion. Using three zones of conversion increases the conversion to product sulfur and decreases the amount of unreacted sulfur compounds in the tail gas.

Usually, the sulfur plant tail gases are incinerated to convert sulfur compounds to sulfur dioxide and thereby essentially completely eliminate the poisonous $H_2S$ component. However, most heavily populated areas also desire that the level of $SO_2$ emissions be reduced to a very low parts per million level.

In the May 1971 "Hydrocarbon Processing" magazine, at p. 89, Institut Francais du Pétrole's (IFP) process for treating sulfur plant tail gases is discussed. IFP process uses a solvent catalyst system to scrub out $H_2S$ and oxidize the $H_2S$ to elemental sulfur. However, the tail gas effluent from the IFP process still has about 1,500 to 2,500 parts per million sulfur compounds.

U.S. Pat. 3,363,401 is also directed to a process for the treatment of sulfur plant tail gas. According to this patent, the tail gases are treated by an adsorption process for the removal of sulfur compounds. However, the residual sulfur compounds left in the tail gas after the adsorption process is still of the order of a thousand or more parts per million sulfur.

Another process which has been proposed for treatment of sulfur plant tail gases is the Beavon process, which is described in "Hydrocarbon Processing," Oct. 1970, at p. 15. According to this process, sulfur plant tail gases are first hydrogenated using a cobalt-molybdate catalyst to form hydrogen sulfide and then the hydrogen sulfide is removed by a scrubbing process such as the Stretford process.

The Stretford process uses an alkaline solution generally containing a vanadium catalyst so that the $H_2S$ is both absorbed into the scrubbing solution and also oxidized to form sulfur in an oxidation reduction reaction involving the vanadium component of the scrubbing solution. A Stretford-type process is described in U.S. Pat. 3,097,926.

One problem remaining with the Beavon hydrogenation-type method for tail gas treatment is that the COS concentration from the hydrogenation step is typically about 200 parts per million. Since little of the COS is removed or converted in typical downstream processing, this carbonyl sulfide goes out the sulfur plant tail gas stack.

For $H_2S$ removal from gas streams, in addition to the Stretford process, various well known processes can be employed, such as absorption in an amine solvent. Monoethanolamine (MEA) is a common amine absorbent used for $H_2S$ scrubbing. However, carbonyl sulfide reacts with MEA, resulting in high solvent losses and degradation of the solvent. Diethanolamine (DEA) han been used in many applications to avoid the degradation losses caused when MEA is contacted with $H_2S$ gas streams containing COS. However, DEA forms heat stable, organic acid salts with carbonyl sulfide so that it also is not an attractive method in general for COS removal. In addition, DEA is more expensive than MEA. Diglycolamine (DGA) has been usually not recommended for use when the gas stream to be sweetened (that is, treated for sulfur compound removal) contains COS. Recently, however, it has been suggested that DGA can be used for sweetening when COS is present, but with a rather complicated regeneration procedure of converting the COS-caused degradation products back to DGA by the addition of low chloride content alkali to the DGA solvent reclaimer and heating at the end of the reclaiming cycle.

SUMMARY

According to the present invention a process is provided for removing sulfur compounds from sulfur plant tail gases comprising $SO_2$, COS, $CS_2$+S, and $H_2S$ which comprises (a) oxidizing the tail gas stream to convert COS to $SO_2$ and $CO_2$, (b) feeding the oxidized gas stream to a hydrogenating zone and therein hydrogenating the oxidized gas stream by a process which comprises contacting the oxidized gas stream with a hydrogenation catalyst at a temperature between 400° and 900° F. and in the presence of hydrogen gas to obtain a hydrogenated gas stream comprising $H_2S$ and $CO_2$, (c) scrubbing $H_2S$ from the hydrogenated gas stream to obtain a purified stream.

According to a preferred embodiment of my invention, it is critical to maintain the $H_2O$ concentration of the oxidized gas stream fed to the hydrogenation zone at least 0.4 mole $H_2O$ per mole of the oxidized gas stream. The process of the present invention is directed to the production of a sulfur plant tail gas containing less than 100 parts per million sulfur compounds, and the maintenance of the $H_2O$ level above about 0.4 mole of $H_2O$ per mole of the oxidized gas stream is important to keep the COS to a low part per million level, for example, below about 25 parts per million in COS by volume. Parts per million are given herein by volume.

In this preferred embodiment of the present invention, wherein the $H_2O$ level is maintained at at least 0.4 mole $H_2O$ per mole of the oxidized gas stream, we have found that it is even more advantageous to maintain the moles $H_2O$ above about 0.6 mole per mole feed gas to the hydrogenation step, as at about this point a knee occurs in the curve of COS versus $H_2O$ concentration, as can be seen from the drawing. At about 0.6 to 0.7 mole $H_2O$ per mole feed gas, the COS level is at about 10 parts per million or lower with only greatly diminished improvement in COS reduction by the use of further $H_2O$.

The COS reduction in accordance with this preferred embodiment of the present invention is considered to be a direct result of shifting the equilibrium of the reaction

Thus, in the present invention the maintenance of the $H_2O$ at a high level in the hydrogenation step may be considered to result in maintenance of the COS at low level by helping to prevent the COS from progressively being formed by the reaction of $CO_2 + H_2O$ in the hydrogenation zone.

In the present invention, oxidation is used ahead of hydrogenation to reduce the COS in the sulfur plant tail gas to a very low level ahead of the hydrogenation step of the present process combination. Because the reaction given above for the formation of COS is relatively slow to equilibrate, it is advantageous and important in the present process to reduce the COS to a low level ahead of the hydrogenation step rather than simply to rely on $H_2O$ to reduce the COS in the hydrogenation zone or subsequent zones by a hydrolysis reaction. Thus, the present invention operates to minimize the amount of carbonyl sulfide in the sulfur plant tail gas by first destroying by incineration the relatively large amounts of carbonyl sulfide formed in the sulfur plant reaction zones. Starting with extremely low carbonyl sulfide, for example, a few parts per million or less at the inlet to the hydrogenation step of the present process combination, only small amounts of carbonyl sulfide are formed in the hydrogenation step because of the relatively slow rate of reaction. Thus the process of the present invention is in contrast to the direct hydrogenation of sulfur plant tail gas as, for example, in a Beavon-type process as described in "Hydrocarbon Processing" October 1970, p. 15. In the Beavon-type process, relatively large amounts of carbonyl sulfide are fed to the hydrogenation zone, and only partial hydrolysis of carbonyl sulfide to hydrogen sulfide can be obtained because of the slow reaction rate. Thus, in this latter situation, higher COS concentrations tend to result because equilibrium is being approached from the high COS concentration side.

The oxidation step which is used in the process of the present invention can be carried out using conventional incineration processes and equipment, and typically comprises burning the sulfur plant tail gas combustible components with air or oxygen-containing gas.

The hydrogenation step of the present invention is carried out with a hydrogenation catalyst at a temperature between 400° and 900° F. Hydrogenation catalysts of various types can be used, such as those containing Group VIII and/or Group VIB metal components, for example, molybdenum sulfide catalysts or nickel-molybdenum catalysts. The Groups VIII and VIB metal components usually are supported on a refractory material such as alumina, silica, or other Groups II through IV metal oxides. Relatively low cost catalysts, such as cobalt-molybdenum catalysts, have been found to be very attractive for use in the process of the present invention.

The next step of the present process combination, the $H_2S$ scrubbing step, can be carried out by various known liquid solvents for $H_2S$. The $H_2S$ can be simply absorbed, or it can be absorbed and reacted in a common scrubbing operation such as a Stretford process, which is typified by U.S. Pat. No. 3,097,926. Thus, the term "$H_2S$ scrubbing" is used herein to mean removal of $H_2S$ from gas streams comprising $H_2S$ and other components such as nitrogen and carbon dioxide.

A preferred means for carrying out the $H_2S$ scrubbing operation is to use a common scrubbing and oxidizing system for the one step removal and conversion of the $H_2S$ to sulfur. A preferred means for carrying out this combined $H_2S$ absorption and oxidation to sulfur is a Stretford-type proces, using an $H_2S$ solvent comprising an anthraquinone disulfonic acid or acid salt. As described in U.S. Pat. 3,035,889, the Stretford-type process comprises washing an $H_2S$-containing gas "with an aqueous alkaline solution of at least one anthraquinone disulfonic acid whereby the hydrogen sulphide is oxidized and sulphur is liberated, and the reduced anthraquinone disulphonic acid is reoxidized by means of a gas consisting at least in part of oxygen." As described in U.S. Pat. 3,097,926, the Stretford process comprises contacting the $H_2S$-containing with an aqueous alkaline solution containing a metal vanadate, a salt of a metal having at least two valency states, and at least one sequestering or chelating agent suitable for retaining the metal salt in solution, whereby the hydrogen sulfide is oxidized, elemental sulfur is formed, and wherein the reduced vanadate is reoxidized by a means of free oxygen or gas containing free oxygen. The Stretford process is also described by T. Nichlin and B. H. Holland in "Gas Journal," Mar. 6, 1963, pp. 292–294, and by H. S. Pylant in the "Oil and Gas Journal," June 3, 1968, pp. 91–95.

BRIEF DESCRIPTION OF THE DRAWING

The drawing is a graph showing the relation of carbonyl sulfide content in the effluent gas from the hydrogenation step of the present invention as a function of moles $H_2O$ per mole feed gas to the hydrogenation step.

EXAMPLES AND DETAILED DESCRIPTION OF THE DRAWING

Typical sulfur plant tail gas streams contain sulfur dioxide, hydrogen sulfide, carbon dioxide, and carbonyl sulfide. In the process of the present invention the sulfur plant tail gas is burned or incinerated to form an oxidized gas stream comprising $SO_2$, $CO_2$, and nitrogen. To simulate the oxidized sulfur plant tail gas, a stream containing 1.5 volume percent $SO_2$, 10 percent $CO_2$, and 81.7 percent nitrogen was used in hydrogenation test runs. 6.8 percent hydrogen was also present in the stream so that the hydrogenation would be carried out in the presence of gaseous hydrogen. In plant operation the hydrogen can be obtained by various alternate sources, for example, a line burner with a rich fuel-to-air mixture can be used to supply hydrogen. The hydrogen should be between about 0.5 and 50 volume percent of the feed gas, and usually between about 1 and 10 volume percent is satisfactory.

The $SO_2$—$CO_2$—$N_2$—$H_2$ gas stream was contacted with 2.0 cubic centimeters of a cobalt-molybdenum catalyst. The catalyst composition and pore volume was as follows:

8% Mo, 3% Co on $Al_2O_3$ (Pore vol.=0.664 cc./g.)

The hydrogenation was carried out at about atmospheric pressure. Essentially complete sulfur dioxide hydrogenation to $H_2S$ was obtained and the following COS levels were found for the effluents from the hydrogenation step.

TABLE I

| Run: | Feed rate, s.c.f./hr. | Water rate, s.c.f./hr. | Temp. | COS, p.p.m. |
|---|---|---|---|---|
| 1 | 1,200 | 0 | 700 | 120 |
| 2 | 1,200 | 0 | 600 | 115 |
| 3 | 1,200 | 0 | 550 | 75 |
| 4 | 1,200 | 0 | 500 | 21 |
| 5 | 1,200 | 800 | 700 | 15 |
| 6 | 1,200 | 800 | 600 | 9 |
| 7 | 1,200 | 800 | 500 | 3.8 |
| 8 | 1,200 | 1,600 | 600 | 3.7 |

The data as summarized in Table I above shows the importance of the water level in maintaining the COS at a low level in the hydrogenation step of the present invention. As shown by the graph, wherein COS parts per million by volume is plotted as the ordinate, the moles $H_2O$ per mole feed gas to the hydrogenation step is plotted as the abscissa, a knee in the curve of COS versus $H_2O$ content occurs at about 0.4 to 0.6 mole $H_2O$ per mole feed gas. To maintain very low COS levels, the $H_2O$ content should be maintained above 0.4, and preferably above 0.6 mole $H_2O$ per mole feed gas to the hydrogenation step.

Although various embodiments of the invention have been described, it is to be understood that they are meant to be illustrative only and not limiting. Certain features may be changed without departing from the spirit or scope of the present invention. It is apparent that the present invention has broad application to the purification of sulfur plant tail gases by a process comprising the interdependent process steps of oxidation, hydrogenation, and then $H_2S$ scrubbing. Accordingly, the invention is not to be construed as limited to the specific embodiments or examples discussed but only as defined in the appended claims or substantial equivalents thereto.

What is claimed is:
1. A process for removing sulfur compounds from a sulfur plant tail gas comprising $SO_2$, COS, $CS_2$, entrained and vaporized S, and $H_2S$ which comprises:
    (a) oxidizing the tail gas stream to convert said COS, $CS_2$ and entrained and vaporized S to $SO_2$ and $CO_2$,
    (b) feeding the oxidized gas stream to a hydrogenating zone and therein hydrogenating the sulfur dioxide content of said oxidized gas stream by a process which comprises contacting the oxidized gas stream with a hydrogenation catalyst at a temperature between 400° and 900° F. and in the presence of hydrogen gas to obtain a hydrogenated gas stream comprising $H_2S$ and $CO_2$, said oxidized gas stream having a water content of at least 0.4 mole of $H_2O$ per mole of said oxidized gas stream, and
    (c) scrubbing $H_2S$ from the hydrogenated gas stream to obtain a purified stream.

2. A process in accordance with claim 1 wherein said water content is at least 0.6 mole.

3. A process in accordance with claim 1 wherein the hydrogenation is carried out by a process which comprises contacting the oxidized gas stream with a catalyst comprising cobalt and molybdenum.

4. A process in accordance with claim 1 wherein said water content is at least .65 mole.

5. A process in accordance with claim 1 wherein the $H_2S$ is scrubbed from the hydrogenated gas stream and oxidized to form elemental sulfur in the solvent used to scrub the $H_2S$ from the hydrogenated gas stream.

6. A process in accordance with claim 5 wherein the scrubbing of the hydrogen sulfide and oxidation to elemental sulfur is carried out by contacting the hydrogenated gas stream with an aqueous alkaline solution containing a metal vanadate, a salt of a metal having at least two valency states, and at least one sequestering or chelating agent suitable for retaining the metal salt in solution, whereby the hydrogen sulfide is oxidized elemental sulfur is formed, and wherein the reduced vanadate is reoxidized by a means of free oxygen or gas containing free oxygen.

References Cited
UNITED STATES PATENTS

| 2,887,363 | 5/1959 | Viles | 423—574 |
| 3,058,800 | 10/1962 | Frevel | 423—244 |
| 3,495,941 | 2/1970 | Van Helden | 423—244 |

EARL C. THOMAS, Primary Examiner

S. B. SHEAR, Assistant Examiner

U.S. Cl. X.R.
423—244, 542, 573